US008398373B2

(12) United States Patent
Matsuda et al.

(10) Patent No.: US 8,398,373 B2
(45) Date of Patent: Mar. 19, 2013

(54) WIND TURBINE BLADE PITCH-CONTROL SYSTEM, AND WIND TURBINE ROTOR AND WIND TURBINE GENERATOR PROVIDED WITH THE SAME

(75) Inventors: Mioko Matsuda, Tokyo (JP); Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/084,938

(22) Filed: Apr. 12, 2011

(65) Prior Publication Data

US 2012/0063901 A1  Mar. 15, 2012

Related U.S. Application Data

(63) Continuation of application No. PCT/JP2011/053170, filed on Feb. 15, 2011.

(51) Int. Cl.
*B63H 3/08* (2006.01)
(52) U.S. Cl. ........................................................ 416/156
(58) Field of Classification Search .................. 416/147, 416/155, 156, 157 R, 157 A, 157 B, 158; 92/118, 161
See application file for complete search history.

(56) References Cited

U.S. PATENT DOCUMENTS

| 420,151 | A | | 5/1980 | Huetter |
| 4,784,355 | A | * | 11/1988 | Brine ............................ 244/213 |
| 5,354,175 | A | * | 10/1994 | Coleman et al. ................. 416/9 |
| 7,530,785 | B1 | * | 5/2009 | Deering et al. ................... 416/1 |
| 2008/0292462 | A1 | * | 11/2008 | Munch .......................... 416/153 |
| 2010/0276932 | A1 | | 11/2010 | Numajiri |

FOREIGN PATENT DOCUMENTS

| EP | 0 043 872 | 1/1982 |
| GB | 2071779 | 9/1981 |
| JP | 2008-291789 | 12/2008 |
| JP | 2010-203260 | 9/2010 |
| WO | WO 2009064264 A1 * | 5/2009 |

OTHER PUBLICATIONS

Japan Patent Office, "Decision to Grant a Patent for JP 2011-514971", Jan. 29, 2013.

* cited by examiner

*Primary Examiner* — Ninh H Nguyen
*Assistant Examiner* — Adam W Brown
(74) *Attorney, Agent, or Firm* — Manabu Kanesaka (57) ABSTRACT

A pitch-control system according to the present invention includes a cylinder support portion provided on a rotor hub, a support point thereof being located away from a front end face (unsupported end) of the rotor hub on the opposite side of the rotor hub; a decentered coupling point provided at a decentered location on a root-side end face of the wind turbine blade; and a cylinder that is installed so as to pass through the unsupported end of the rotor hub, a coupling portion that is provided on a portion that protrudes to the outer side from the unsupported end being coupled in a freely rotatable manner to the support point via a spherical joint, and a coupling portion that is on the inner side of the unsupported end being coupled in a freely rotatable manner to the decentered coupling point via a spherical joint.

11 Claims, 12 Drawing Sheets

WIND TURBINE BLADE PITCH-CONTROL SYSTEM, AND WIND TURBINE ROTOR AND WIND TURBINE GENERATOR PROVIDED WITH THE SAME

CROSS REFERENCE TO RELATED APPLICATIONS

This application is a continuation application of PCT/JP2011/053170 filed on Feb. 15, 2011.

BACKGROUND OF THE INVENTION

1. Field of the Invention

The present invention relates to a wind turbine blade pitch-control system for changing the pitch angles of wind turbine blades, and to a wind turbine rotor and wind turbine generator provided with the same.

2. Description of Related Art

Standard propeller-type wind turbine generators are equipped with a wind turbine rotor in which a plurality of wind turbine blades are attached to a rotor hub serving as a rotation center. These blades are configured so that the wind turbine rotor is rotatably supported at a surface on the upwind side of a nacelle that is supported at the top of a tower in a manner allowing yawing thereof, and a generator installed inside the nacelle is driven by rotation of the wind turbine rotor to perform power generation. In the case of an upwind-type wind turbine generator, the nacelle is subjected to slew driving control so that the rotational center axis of the rotor hub (wind turbine rotor) always points in the upwind direction, which enables efficient power generation.

In recent years, as disclosed in Patent Literature 1 etc., pitch-control systems that rotate the individual wind turbine blades provided on the wind turbine rotor relative to the rotor hub by means of a driving source, such as hydraulic oil, so as to change the pitch angle (angle of attack) of each wind turbine blade have been installed. With this pitch-control system, the wind turbine blades are rotated to the fine side, where the pitch angle is greater, at the time of weak wind force and are rotated to the feather side, where the pitch angle is smaller, at the time of strong wind force. By doing so, it is possible to cause the generator to generate power close to the desirable rotational speed.

In the wind turbine generator disclosed in Japanese Unexamined Patent Application, Publication No. 2008-291789, as shown in FIGS. 3 to 6 therein, a middle portion of a cylinder for changing the pitch angle of a wind turbine blade is supported, in a freely oscillating manner, by a trunnion bearing provided on the rotor hub. The wind turbine generator has a configuration in which the end of a rod that extends in an extendible/retractable manner from this cylinder is coupled in a freely rotatable manner to a coupling shaft provided on a root-side end face of the wind turbine blade (the end face of the wind turbine blade inside the hub) at a decentered position relative to the pitch rotation axis via a spherical bearing (rod bearing), and the wind turbine blade rotates by the extension/retraction of the rod so as to change the pitch angle.

However, because the middle portion of the cylinder is supported at the front end face of the rotor hub via the trunnion bearing, as described above, the structure of the pitch-control system becomes complex, causing the weight around the cylinder to increase, and there is a demand for an improved wind turbine rotor with a simpler structure and lower weight. However, the trunnion bearing, which has a complex structure, is expensive and difficult to maintain, resulting in the problem of running up construction costs and running costs of wind turbine generators.

In addition, because the trunnion bearing must, by necessity, have a large outer diameter from a structural viewpoint, a large hole must be formed in the rotor hub for passing the trunnion bearing therethrough, and this is one factor that ruins the strength of the rotor hub.

To efficiently convert the extending/retracting force of the cylinder to a rotational force of the wind turbine blade, the axes of the cylinder and the rod preferably should be parallel to the root-side end face of the wind turbine blade. However, because the trunnion bearing is large, as described above, in order to prevent interference with the root-side end face of the wind turbine blade, it is necessary to locate the trunnion bearing sufficiently far from the root-side end face of the wind turbine blade. Accordingly, the height of a coupling shaft to which the end of the rod is coupled at the root-side end face of the wind turbine blade, as described above, inevitable must be high. Therefore, the extending/retracting force of the rod ends up exerting a large bending moment at the base of the coupling shaft, and the coupling shaft is easily damaged, causing concern that the durability of the pitch-control system is reduced.

BRIEF SUMMARY OF THE INVENTION

The present invention has been conceived to solve the problems described above, and an object thereof is to provide a wind turbine blade pitch-control system that can change the pitch angle of a wind turbine blade with a simple, lightweight, inexpensive, and highly durable structure without ruining the strength of individual parts, including the rotor hub, and that operates with high efficiency, as well as a wind turbine rotor and a wind turbine generator equipped with the same.

In order to realize the above object, the present invention provides the following solutions.

A first aspect of a wind turbine blade pitch-control system according to the present invention, which is a wind turbine blade pitch-control system for rotationally driving a wind turbine blade about an axis thereof relative to a rotor hub rotatably supported on a nacelle, includes a cylinder support portion provided on the rotor hub, a support point thereof being located away from an unsupported end of the rotor hub on the opposite side of the rotor hub; a decentered coupling point provided at a decentered location on a root side end face of the wind turbine blade; and a cylinder the is installed so as to pass through the unsupported end of the rotor hub, a portion thereof that protrudes to the outer side from the unsupported end being coupled in a freely rotatable manner to the support point, and an end that is on the inner side of the unsupported end being coupled in a freely rotatable manner to the decentered coupling point.

In the case of the above structure, because the cylinder is coupled to the support point of the cylinder support portion, which is located farther outward than the unsupported end of the rotor hub, a trunnion bearing as is used conventionally for holding the middle portion of the cylinder in the rotor hub in a freely rotatable manner becomes unnecessary, and the cylinder is coupled to the rotor hub with a structure that is much simpler than the case where a trunnion bearing is used.

Therefore, the structure of the pitch-control system can be simplified and the weight around the cylinder can be reduced, and because no trunnion bearing, which is expensive and difficult to maintain, is used, this can contribute to considerable cost savings.

Moreover, because it is not necessary for a trunnion bearing, which has a large outer diameter, to pass through, the size of the cylinder through-hole formed in the rotor hub can be made small enough to allow insertion of the cylinder while avoiding vibrations associated with the extension and retraction of the cylinder. Therefore, there is no concern about ruining the strength of the rotor hub.

Furthermore, because a large-outer-diameter trunnion bearing is eliminated, the distance between the end of the rod that protrudes from the cylinder and the root-side end face of the wind turbine blade can be reduced; therefore, the height of the decentered coupling point provided at the root-side end face of the wind turbine blade is reduced so that, even though a force is applied to this decentered coupling point from the rod, a large bending moment is not applied to the base of the decentered coupling point, so that it is possible to prevent damage to the decentered coupling point and to improve the durability of the pitch-control system.

A second aspect of a wind turbine blade pitch-control system according to the present invention is characterized in that, in the first aspect described above, the cylinder coupling portion coupling with the support point and the cylinder coupling portion coupling with the decentered coupling point are coupled via spherical joints.

According to the above-described configuration, even if the relative position of the decentered coupling point with respect to the support point changes slightly in the direction of a right angle relative to the oscillating direction of the cylinder, this change is absorbed by rotation of the spherical joints at the coupling portions of the cylinder with the support point and the decentered coupling point. Therefore, no problem arises even if the mounting precision of the wind turbine blades on the rotor hub is somewhat reduced. Accordingly, the assembly tolerances required when assembling the pitch-control system of the present invention are relaxed, which makes it possible to reduce the construction costs of the wind turbine rotor.

A third aspect of a wind turbine blade pitch-control system according to the present invention is characterized in that, in the first aspect described above, the cylinder support portion forms a substantially inverted V-shape that stands upright from the unsupported end of the rotor hub, as viewed from the axial direction passing through the support point, and two legs thereof are angled to be substantially parallel to an axis at one rotation extremity and an axis at another rotation extremity of the cylinder, respectively.

According to the above-described configuration, regardless of the rotation angle of the cylinder, the reaction force thereof can be efficiently borne at the two legs of the cylinder support portion, and it is possible to achieve a reduction in weight of the pitch-control system and the wind turbine rotor by virtue of the corresponding reduction in excess bulk of the cylinder support portion.

A fourth aspect of a wind turbine blade pitch-control system according to the present invention is characterized in that, in the first aspect described above, the cylinder support portion forms a substantially inverted V-shape that stands upright from the unsupported end of the rotor hub, as viewed from the axial direction passing through the support point, and of two legs thereof, the strength of the lea where a larger reaction force is applied from the cylinder is made higher than the strength of the other leg.

With the above-described configuration, it is possible to increase the durability of the pitch-control system by ensuring sufficient strength of the cylinder support portion, and at the same time, it is possible to achieve reductions in weight of the pitch-control system and the wind turbine rotor by virtue of the reduction in unnecessary thickness of the cylinder support portion.

A fifth aspect of a wind turbine blade pitch-control system according to the present invention is characterized in that, in the first aspect described above, a hydraulic liquid tube connected to the cylinder is installed so as to pass through the unsupported end of the rotor hub together with the cylinder.

According to the above-described configuration, installation of the hydraulic oil tube is simplified, and a reduction in weight, improved maintainability, and improved ease-of-layout, as well as reduced construction costs as a result thereof, can be expected.

A sixth aspect of a wind turbine blade pitch-control system according to the present invention is characterized in that, in the first aspect described above, an accumulator that accumulates hydraulic pressure for the cylinder is formed in a straight tube shape, and the accumulator is disposed in the vicinity of the cylinder and parallel to an axis of the cylinder and is installed so as to pass through the unsupported end of the rotor hub together with the cylinder.

According to the above-described configuration, because the accumulator is installed in such a manner as to pass through the unsupported end of the rotor hub together with the cylinder, the need to ensure a dedicated space for installing the accumulator is almost entirely eliminated, which makes it possible to increase the space utilization efficiency inside or outside the rotor hub, to improve the ease of assembly and ease of maintenance around the pitch-control system, and to reduce construction costs and running costs of the wind turbine generator in which the wind turbine rotor according to the present invention is used.

A wind turbine rotor and wind turbine generator according to the present invention include the wind turbine blade pitch-control system of the above-described first aspect. Accordingly, it is possible to change the pitch angle of the wind turbine blade with a simple, lightweight, inexpensive, and highly durable structure without ruining the strength of individual parts, including the rotor hub.

As described above, with the pitch-control system according to the present invention, as well as the wind turbine rotor and the wind turbine generator provided therewith, it is possible to change the pitch angles of the wind turbine blades with a simple, lightweight, low-cost, and highly durable structure without ruining the strength of the individual parts, including the rotor hub; particularly in a wind turbine generator, it is possible to smoothly change the pitch angles of the wind turbine blades, which makes it possible to set the wind turbine rotor at a desired rotation speed according to the wind force, which changes over time, enabling highly efficient operation.

BRIEF DESCRIPTION OF THE SEVERAL VIEWS OF THE DRAWINGS

FIG. 6 is a magnified per view showing a cylinder through-hole, a cylinder support portion, a cylinder, and so on.

FIG. 8 is a plan view showing a front end face of the rotor hub, the cylinder through-hole, the cylinder support portion, the cylinder, and so on.

FIG. 9 is a side view showing the front end face of the rotor hub, the cylinder through-hole, the cylinder support portion, the cylinder, and so on.

DETAILED DESCRIPTION OF THE INVENTION

Embodiments will be described below with reference to FIGS. 1 to 13.

First Embodiment

Figure 1:
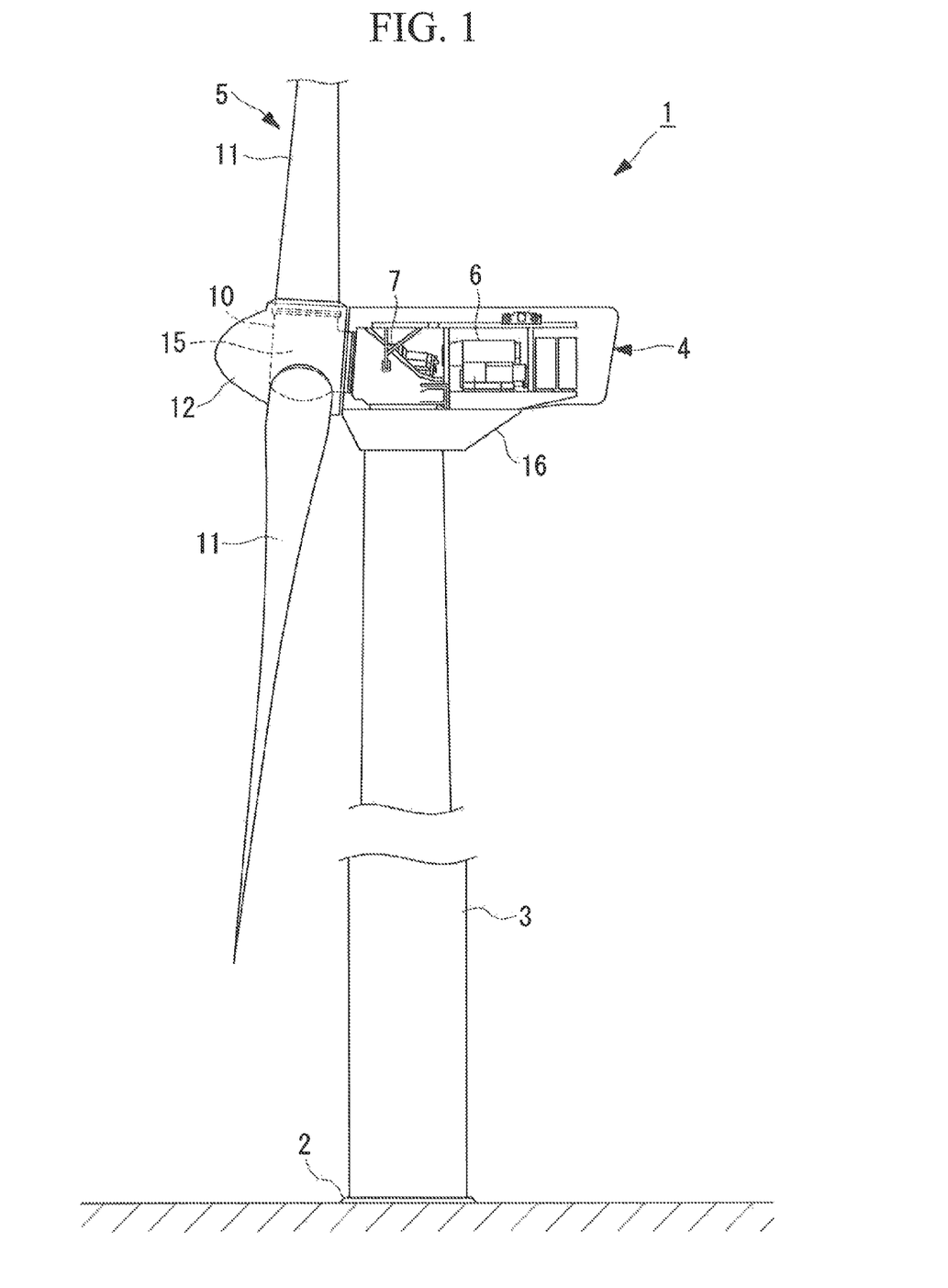
FIG. 1 is a side view showing one example of a wind turbine generator to which a pitch-control system and a wind turbine rotor can be applied.

FIG. 1 is a side view showing an example of a wind turbine generator to which a wind turbine blade pitch-control system according to a first embodiment of the present invention can be applied. This wind turbine generator 1 includes a tower 3 erected, for example, on the top surface of a reinforced concrete foundation 2 embedded in the around; a nacelle 4 installed at the top end of this tower 3; a wind turbine rotor 5 provided on the nacelle 4; and a generator 6 and gear box 7 that are housed inside the nacelle 4 and that perform power generation via rotation of the wind turbine rotor 5.

The wind turbine rotor 5 includes a rotor hub 10 supported by the nacelle 4 in such a manner that it can freely rotate about a substantially horizontal rotational axis in the lateral direction; a plurality of (for example, three) wind turbine blades 11 that are attached to this rotor hub 10 and that extend in the radial directions; a head capsule 12 the covers the rotor hub 10; and a pitch-control system 15 provided inside the rotor hub 10. The pitch-control system 15 is a system for changing the pitch angles of the wind turbine blades 11 by rotating the wind turbine blades 11 in a direction causing them to twist relative to the rotor hub 10.

The nacelle 4 can turn horizontally at the top of the tower, together with the wind turbine rotor 5. This wind turbine generator 1 is of the upwind type in which the orientation of the nacelle 4 is controlled so that the wind turbine rotor 5 always points upwind, and the wind turbine rotor 5 is provided on the face at the upwind side of the nacelle 4. When wind strikes the wind turbine blades 11, the wind turbine rotor 5 (rotor hub 10) rotates, this rotation is increased by the gear box 7 and is transferred to the generator 6, and the generator 6 is driven, performing power generation. The nacelle 4 is controlled by a slew driving apparatus 16 and a control device (not illustrated) so that the wind turbine rotor 5 is always made to point, in the upwind direction to enable efficient power generation.

The pitch-control system 15, in a known fashion, rotates the individual wind turbine blades 11 to the fine side where the pitch angle is increased or the feather side where the pitch angle is decreased, according to the wind conditions and operating conditions. Accordingly, it is possible to set the wind turbine rotor 5 to the desired rotation speed according to the wind force, which changes with time.

FIGS. 2 to 6 show structures in the vicinity of the rotor hub 10 and the pitch-control system 15 in FIG. 1.

Figure 5:
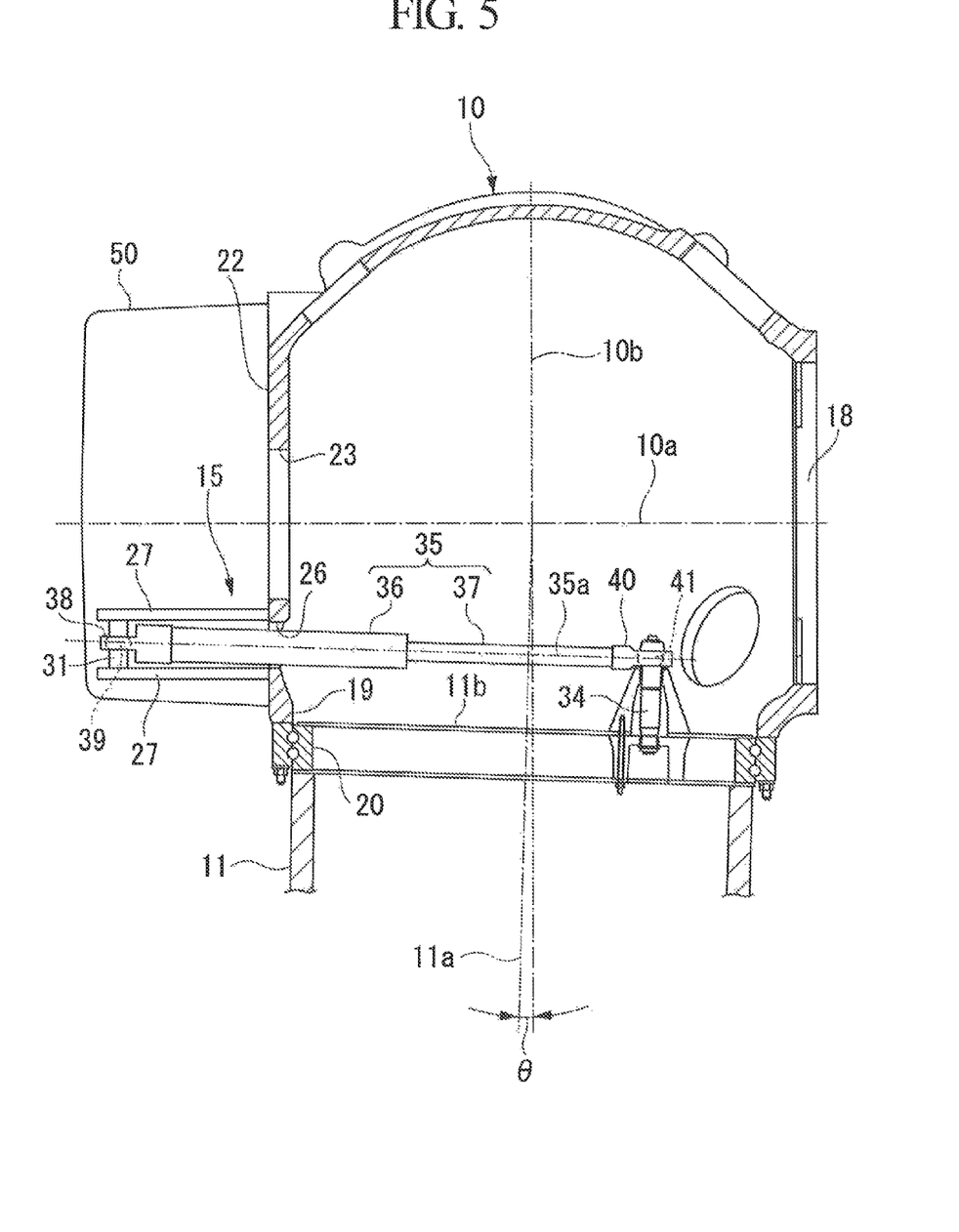
FIG. 5 is a view showing a pitch-control system according to a first embodiment, taken through a sectional plane along line V-V in FIG. 4.

The rotor hub 10 is an integral, unit made of metal, the interior of which is a hollow capsule-shaped component, and a circular-hole-shaped rotating-shaft coupling hole 18 that is coupled to a rotating shaft of the gear box 7 shown in FIG. 1 is formed in the face at the nacelle 4 side. Three circular-hole-shaped wind-turbine-blade mounting holes 19 for mounting the wind turbine blades 11 are formed in the wall surface at the periphery of the rotor hub 10 at 120° intervals. As shown in FIG. 5, base ends of the wind turbine blades 11 are mounted to the wind-turbine-blade mounting holes 19 via large-diameter, ring-shaped, blade-slew ring bearings 20, and the wind turbine blades 11 can freely rotate about axes 11a thereof. Seal members (not illustrated) are interposed between the wind turbine blades 11 and the rotor hub 10 (wind-turbine-blade mounting holes 19), preventing the intrusion of rain, dust, and so forth. An end face 22, which is the unsupported end of the rotor hub 10, that is to say, the end opposite the face supported at the nacelle 4 (the face where the rotating shaft coupling hole 18 is formed), is formed flat, and a maintenance and inspection hole 23, through which maintenance personnel can enter and exit, is provided at the center thereof. Reference sign 24 are lugs for hoisting the rotor hub 10 and the wind turbine rotor 5 with a crane.

The pitch-control system 15 is provided in the rotor hub 10, and a separate one is provided for each wind turbine blade 11. The pitch-control systems 15 are configured as follows.

Figure 4:
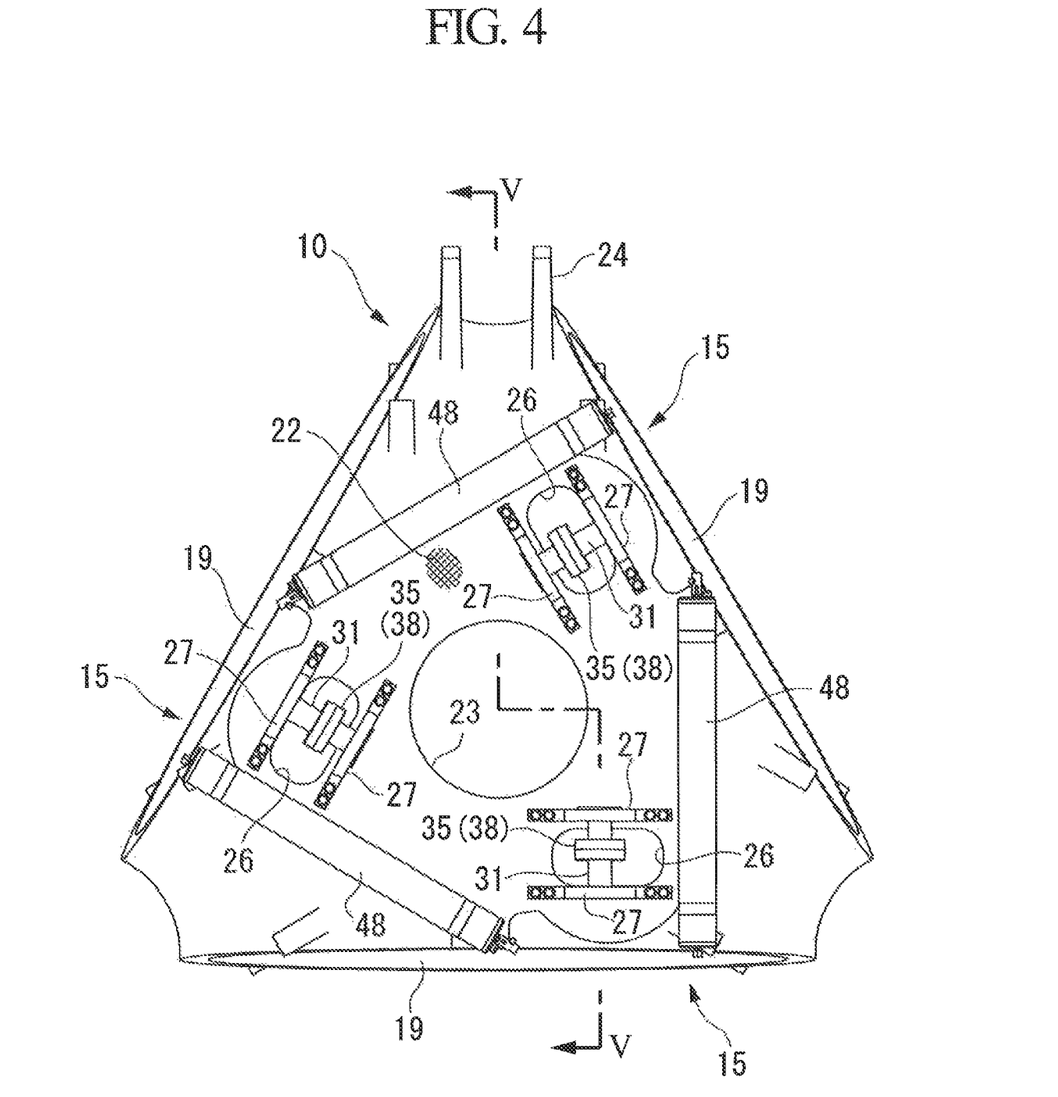
FIG. 4 is a front view of the rotor hub taken along arrow IV in FIG. 3.

First, three cylinder through-holes 26 are formed in the front end face 22 (the unsupported end) of the rotor hub 10 so as to surround the circumference of the maintenance and inspection hole 23. As shown in FIG. 4, these cylinder through-holes 26 are formed in the shape of ovals, and the long-axis directions thereof are parallel to the planes of the openings of the wind-turbine-blade mounting holes 19. Then, in the vicinity of these cylinder through-holes 26, pairs of cylinder support portions 27 are provided along the longitudinal direction of the cylinder through-holes 26 in such a manner as to surround the cylinder through-holes 26.

Figure 6:
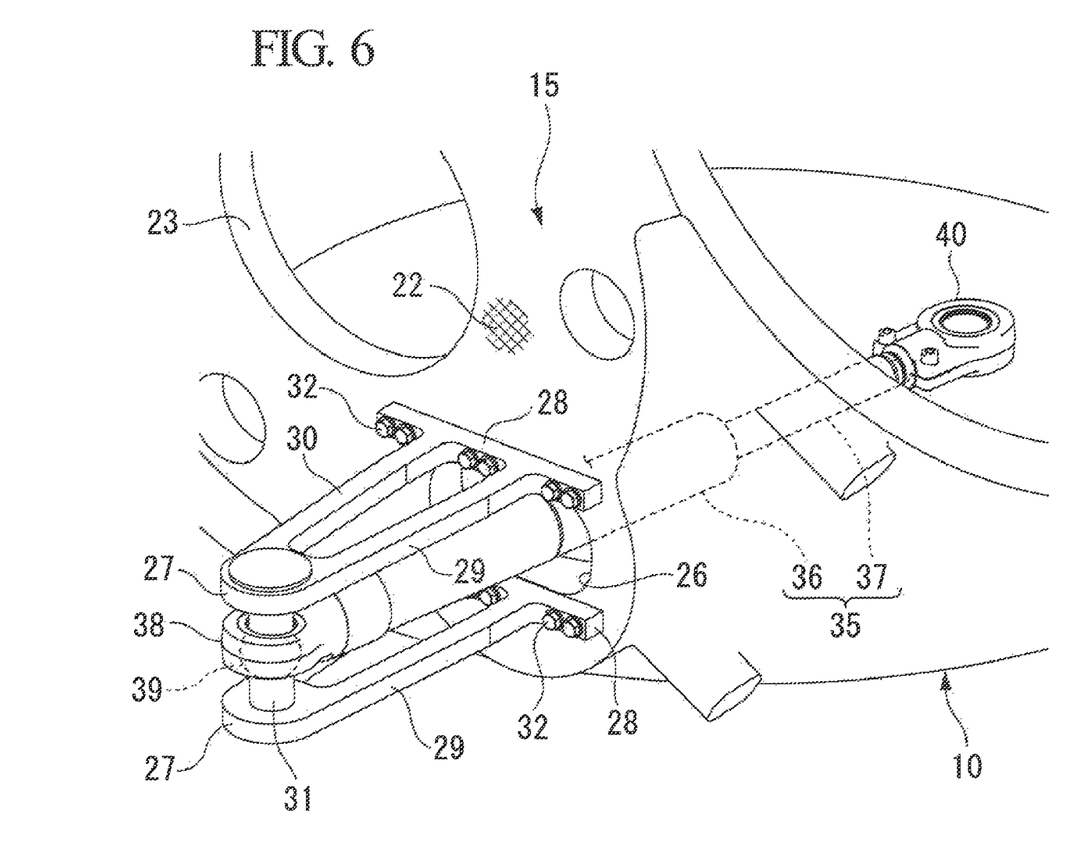
Figure 7:
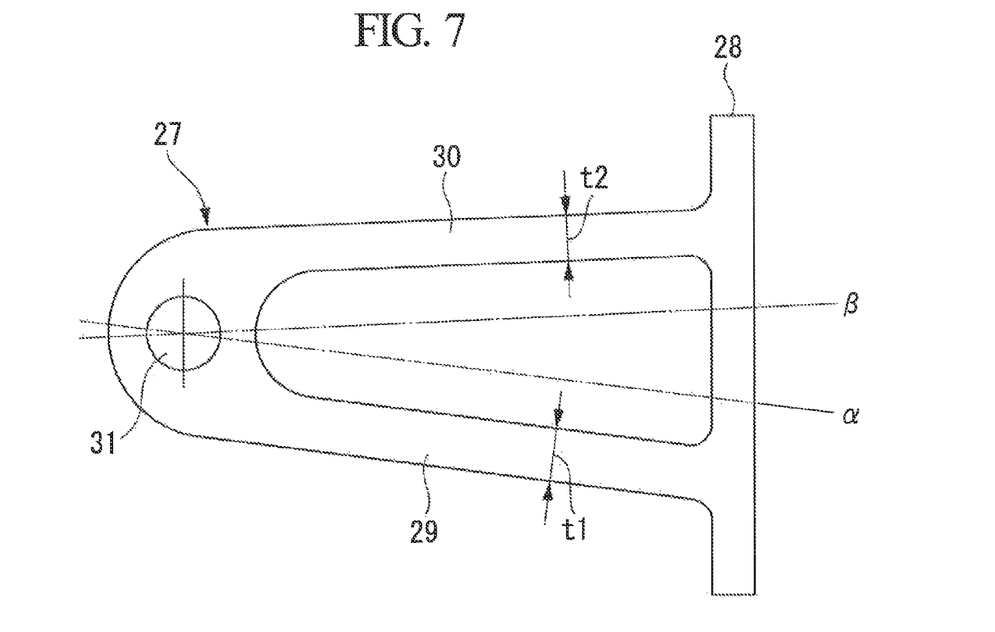
FIG. 7 is a plan view of the cylinder support portion.
Figure 8:
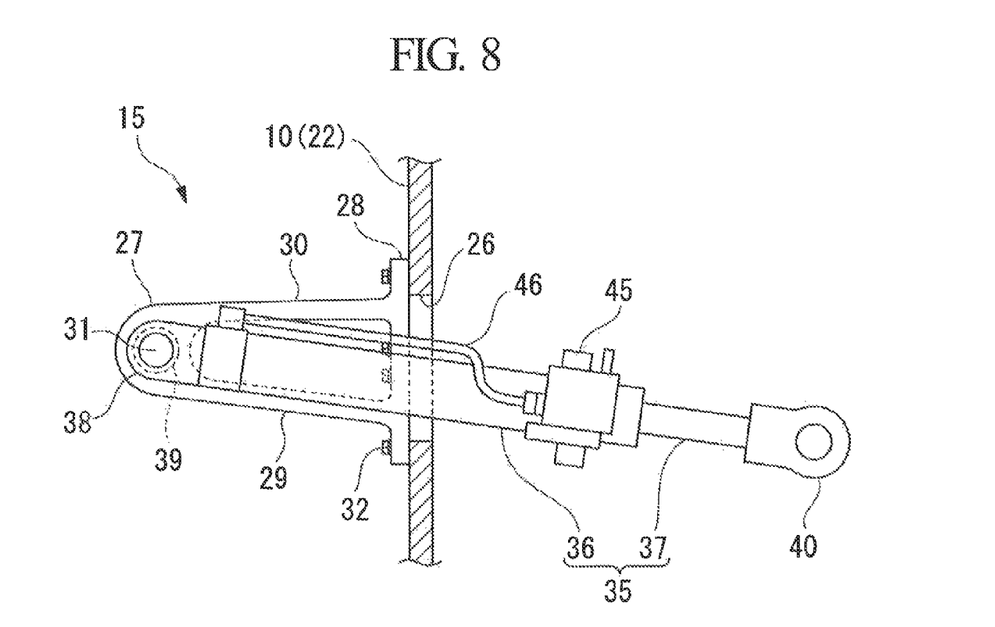

The cylinder support portion 27 is structured as follows. Specifically, as shown in FIGS. 6 to 8, the cylinder support portion 27 includes a securing base 28, a pair of legs 29 and 30 that extend from the securing base 28, and a supporting shaft (support point) 31 installed at the ends of the legs 29 and 30 and between an opposing pair of the cylinder support portions 27, forming a substantially inverted V-shape that stands upright from the front end face 22 of the rotor hub 10 as viewed in the axial direction of the supporting shaft 31. The securing bases 28 are securely fastened to the front end face 22 of the rotor hub 10 with a plurality of fixing bolts 32. Therefore, the supporting shaft 31 of the cylinder support portions 27 is located away from the front end face 22 on the opposite side of the rotor hub 10.

Figure 9:
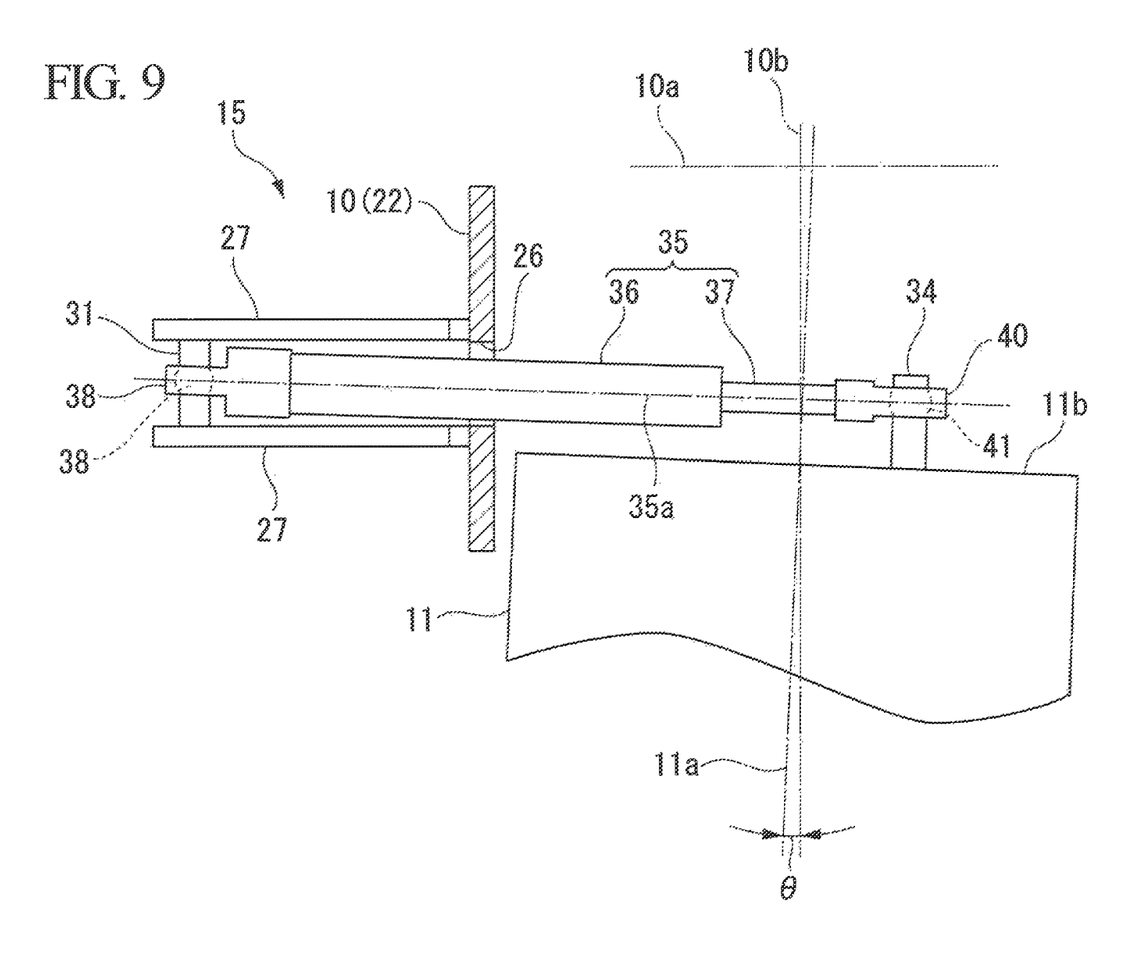
Figure 10:
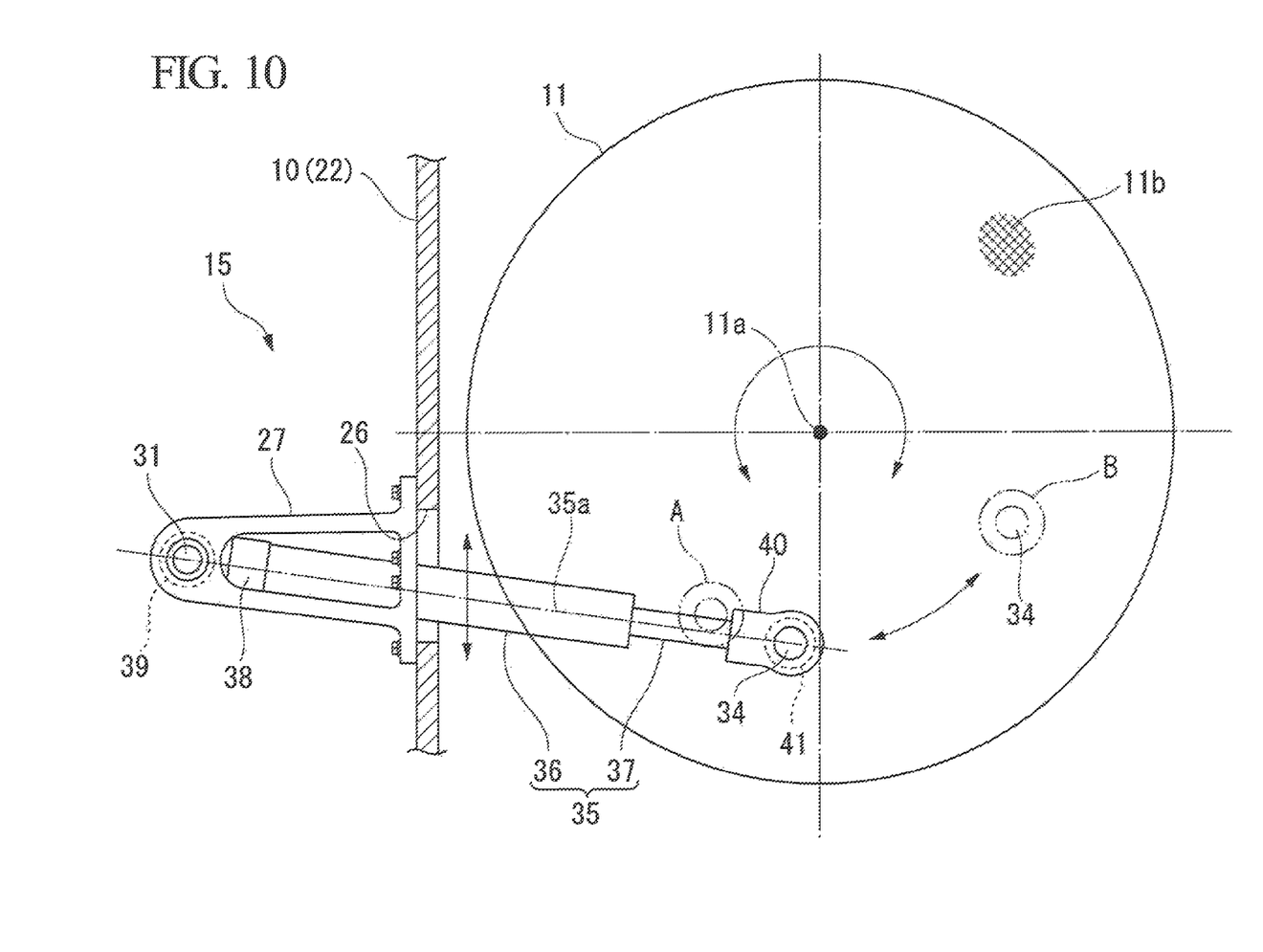
FIG. 10 is a plan view showing the operation of the pitch-control system.

On the other hand, as shown in FIG. 5 and FIGS. 9 and 10, in a root-side end face 11b of the wind turbine blade 11, a support shaft (decentered coupling points) 34 protrudes at a position decentered relative to the axis 11a. Then, as shown in FIGS. 2 to 6 and FIGS. 8 to 10, a cylinder 35 is installed so as to pass through the cylinder through-hole 26. This cylinder 35 is, for example, hydraulic oil cylinder and is formed of a cylinder body 36 and a rod 37 that protrudes from one end of this cylinder body 36.

A coupling portion 38 provided at any position in the part of the cylinder 35 that protrudes to the outer side from the cylinder through-hole 26, for example, the tip of the cylinder body 36, is coupled in a freely rotatable manner to the supporting shaft 31 of the cylinder support portions 27 via a spherical joint 39. Then, the end of the cylinder 35 at the inner side of the cylinder through-hole 26, for example, a coupling portion 40 provided at the end of the rod 37, is coupled in a freely rotatable manner to the supporting shaft 34 of the wind turbine blade 11 via a spherical joint 41.

As shown in FIG. 5 and FIG. 9, the wind turbine blade 11 (axis 11a), is given a cone angle θ of, for example, 2 degrees, so as to be tilted relative to a plane 10b orthogonal to a rotation axis 10a of the rotor hub 10, and the wind turbine blade 11 is deflected during strong wind to avoid the risk of making contact with the tower 3. To achieve this, the cylinder 35 is angled to gradually decline from the coupling portion 38 to the coupling portion 40 in FIG. 5, so that an axis 35a thereof is orthogonal to the axis 11a of the wind turbine 11, and the axis 35a is parallel to the root-side end face 11b of the wind turbine blade 11. Therefore, at the supporting shaft 31 of the cylinder support portion 27, the axis of the supporting shaft 31 and the axis 35a of the cylinder 35 doesn't intersect at a right angle as viewed from the side. However, because the coupling portion 38 of the cylinder body 36 is coupled to the supporting shaft 31 via the spherical, joint 39, an excessive force due to the tilting of the cylinder 35 is not applied to the supporting shaft 31.

As shown in FIG. 10, by extending and retracting the rod 37 from the cylinder 35, the wind turbine blade 11 (supporting shaft 34) rotates by about 90° between a fine position A where the pitch angle is large to a feather position B where the pitch angle is small. The pitch angle, in other words, the amount of extension/retraction of the rod 37 from the cylinder 35 is controlled according to the wind conditions and operating conditions, and the three wind turbine blades 11 are set to the desired pitch angles. When the rod 37 is extended and retracted from the cylinder 35 to change the pitch angle of the wind turbine blade 11, the axis 35a of the cylinder 35 is rotated about the support shaft 31 of the cylinder support portion 27, and the middle portion of the cylinder 35 (cylinder body 36) moves in the longitudinal direction (the direction of the arrow shown in FIG. 10) inside the oval-hole shaped cylinder through-hole 26.

As shown in FIGS. 7 and 10, the cylinder support portion 27 is formed in an asymmetric shape in which the shapes and angles of the two legs 29 and 30 thereof are different. The angles of the individual legs 29 and 30 respectively match the rotation angles of the cylinder 35. That is to say, while the wind turbine blade 11 rotates between the fine position A and the feather position B, the axis of the cylinder 35 rotates from one rotation extremity α to the other rotation extremity β shown in FIG. 7; however, the leg 29 of the cylinder support portion 27 is substantially parallel to the axis at the rotation extremity α at the fine position A, whereas the leg 30 is substantially parallel, to the axis at the rotation extremity β at the feather position B.

Because tire angle of attack of the wind turbine blade 11 is large when the wind turbine blade 11 is at the fine position A, the bending moment applied to the root of the wind turbine blade 11 is large. Therefore, to rotate the wind turbine blade 11 from this fine position A to the feather position B.
a much larger force is required compared with when it is rotated the opposite way from the feather position B to the fine position A (while the cylinder 35 is extending, as shown in FIG. 10). Thus, as described above, the leg 29 of the cylinder support portion 27 is substantially parallel to the axis 35a of the cylinder 35 when a considerable force is exerted as described above (the axis at the rotation extremity α), but because a large reaction force of the cylinder 35 is applied to this leg 29 compared with the other leg 30, the strength of the leg 29 is made higher than the strength of the leg 30. For example, as shown in FIG. 7, a thickness (cross-sectional area) t1 in the lateral direction of the leg 29 is set to be larger than a thickness t2 in the lateral direction of the leg 30. Note that the strength of the leg 29 may be made higher than the strength of the leg 30 by a method other than changing the thickness or cross-sectional area.

As shown in FIG. 8, a manifold block 45 is attached to the cylinder body 36 of the cylinder 35. The manifold block 45 is a valve unit that causes the rod 37 to extend and retract by distributing hydraulic oil, which is supplied from a hydraulic oil pump (not illustrated), to one end or the other end of the cylinder body 36. Then, a hydraulic oil tube (hydraulic liquid tube) 46 in the form of a metal pipe, which extends from the manifold block 45 and is connected to the vicinity of the front tip of the cylinder body 36, passes through the cylinder through-hole 26 in the rotor hub 10, together with the cylinder 35, so as to form a piping layout in which the other end of the hydraulic oil tube 46 is connected to the front tip of the cylinder body 36.

Figure 2:
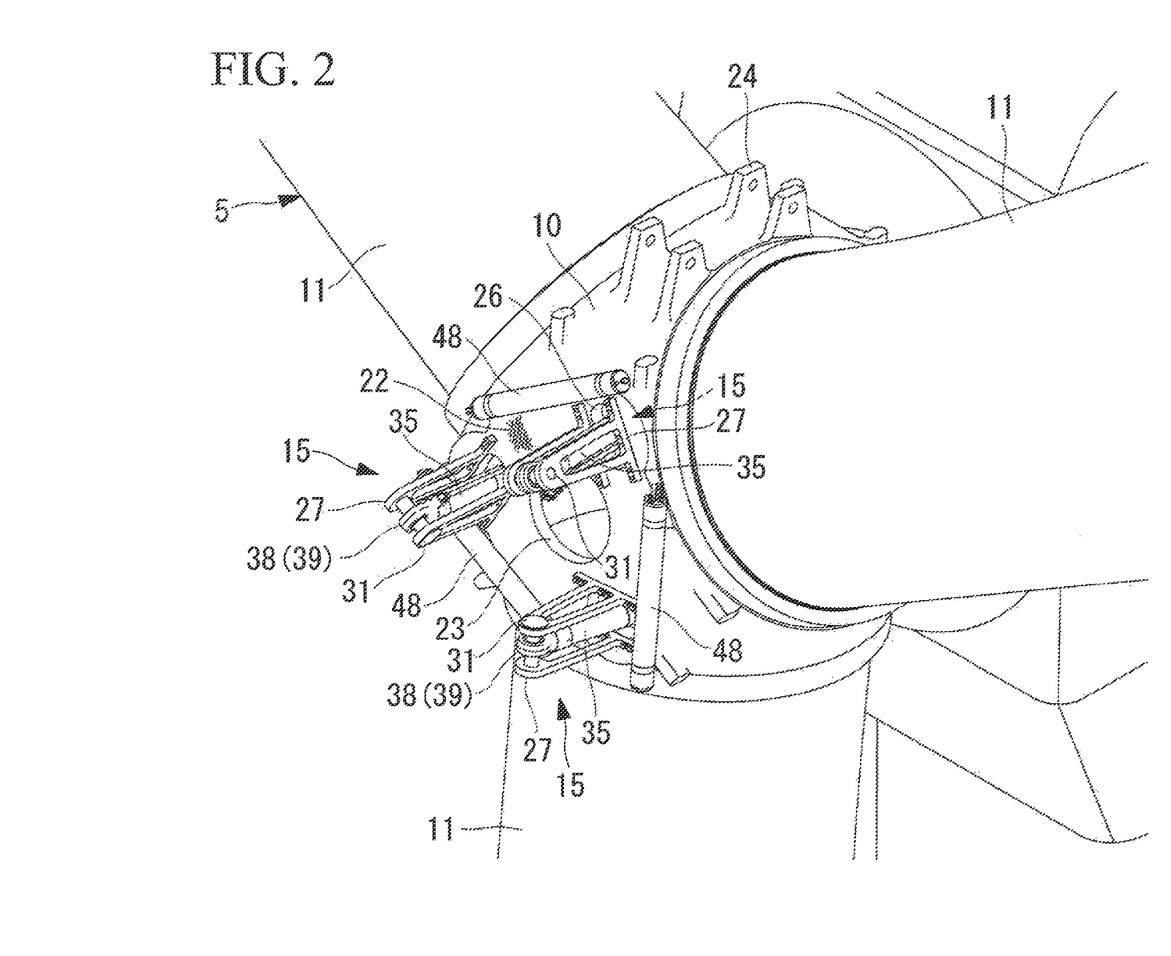
FIG. 2 is an external perspective view for explaining the structure in the vicinity of a rotor hub and the pitch-control system of the wind turbine rotor shown in FIG. 1.
Figure 3:
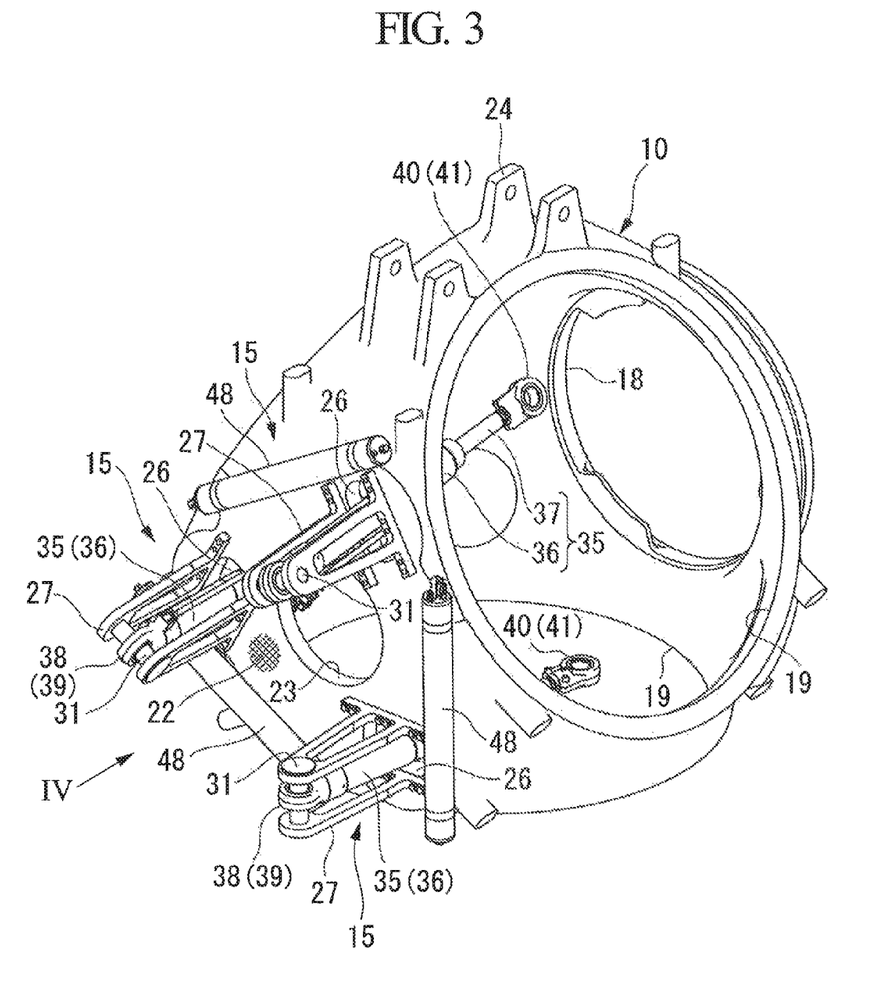
FIG. 3 is a more detailed perspective view of the vicinity of the rotor hub shown in FIG. 2.

Also, as shown in FIGS. 2 to 4, a straight tube-shaped accumulator 48 is attached to the front end face 22 of the rotor hub 10 so as to be positioned close to the cylinder 35. This accumulator 48 is for constantly accumulating sufficient hydraulic oil to rotate the wind turbine blade 11 to the feather position 3 by extending the rod 37 from the cylinder 35 and then to halt the rotating wind turbine blade 11, when the hydraulic oil supply to the cylinder ceases, such as when the pitch-control system 15 is faulty; three of them are provided to match the number of cylinders 35. A hydraulic oil tube (not illustrated) also extends from this accumulator 48 and is connected to the manifold block 45 of the cylinder 35; however, a piping layout in which this hydraulic oil tube passes through the cylinder through-hole 26 together with the hydraulic oil tube 46 described above may also be employed. As shown in FIG. 5, a waterproofing and dustproofing cover member 50 that covers the pitch-control system 15 is provided at the front end face 22 of the rotor hub 10.

The pitch-control system 15 is configured as described above. As described above, this pitch-control system 15 rotates the wind turbine blade 11 between the fine position A and the feather position B by extending and retracting the rod 37 of the cylinder 35 from the cylinder body 36, to give the wind turbine blade 11a pitch angle corresponding to the wind force.

In this pitch-control system 15, the supporting shaft 31 of the cylinder support portion 27 is located away from the front end face 22 on the opposite side of the rotor hub 10, one and of the cylinder 35 is coupled to this supporting shaft 31. Therefore, it is not necessary to hold the middle portion of the cylinder at the front end face 22 of the rotor hub 10 by means of a trunnion bearing, as is done conventionally. Thus, it is possible to couple the cylinder 35 to the rotor hub 10 with a structure that is much simpler than in the case where a trunnion bearing is used. Accordingly, the structure of the pitch-control system 15 can be simplified and the weight around the cylinder 35 can be reduced, and because no trunnion bearing, which is expensive and difficult to maintain, is used, this can contribute to considerable cost savings.

Moreover, because it is not necessary to pass a trunnion bearing, which has a large outer diameter, through the front end face 22 of the rotor huh 10, the size of the cylinder through-hole 26 formed in the front end face 22 of the rotor hub 10 can be made small enough to allow insertion of the cylinder 35 while avoiding vibrations associated with the extension and retraction of the cylinder 35. Therefore, a decrease in strength of the rotor hub 10 caused by forming the cylinder through-hole 26 can be suppressed to a minimum.

Furthermore, because a large-outer-diameter trunnion bearing is eliminated, the distance between the end (coupling portion 40) of the rod 37 that protrudes from the cylinder 35 and the root-side end face 11b of the wind turbine blade 11 can be reduced. Therefore, the height of the supporting shaft (decentered coupling point) 34 provided at the root-side end face 11b is reduced so that, even though a force is applied to this supporting shaft 34 from the rod 37, a large bending moment is not applied to the base of the supporting shaft 34, so that it is possible to prevent damage to the supporting shaft 34 and to improve the durability of the pitch-control system 15.

Figure 11:
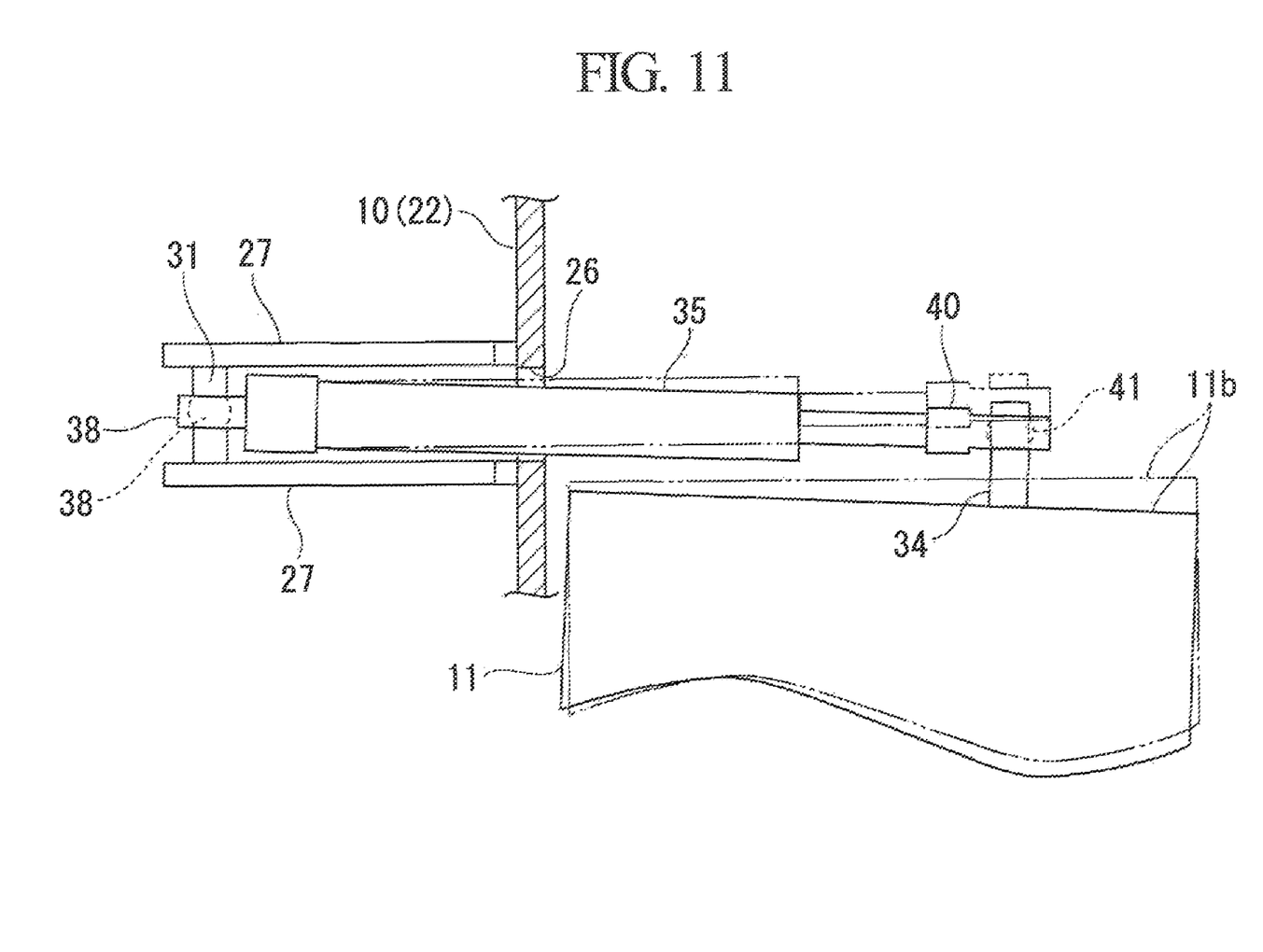
FIG. 11 is a schematic diagram for explaining how the deformation of a wind turbine blade is absorbed at the pitch-control system.

If the load exerted on the wind turbine blade 11 is large, such as during strong wind, deformation occurs at the Mint of the wind turbine blade 11, in the rotor hub 10, etc., and as shown by the two-dot chain line in FIG. 11, the root-side end face 11b of the wind turbine blade 11 moves relative to the rotor hub 10 or deforms. In this case too, because the coupling portion 38 and the coupling portion 40 of the cylinder 35 are coupled, in a freely rotatable manner, to the supporting shaft 31 of the cylinder support portion 27 and the supporting shaft 34 of the wind turbine blade 11 via the respective spherical joints 39 and 41, they can follow the relative positional displacement between the supporting shaft 31 and the supporting shaft 34 due to the deformation or movement as described above, and the pitch angle of the wind turbine blade 11 can be smoothly changed.

Moreover, even if the relative position of the support shaft 34 with respect to the support shaft 31 changes slightly in the direction of a right angle relative to the oscillating direction of the cylinder 35, this change is absorbed by rotation of the spherical joints 39 and 41 at the coupling portions 38 and 40 of the cylinder 35 and the supporting shafts 31 and 34; therefore, no problem arises even if the mounting precision of the wind turbine blades 11 on the rotor hub 10 is somewhat reduced. Accordingly, the assembly tolerances required when assembling the pitch-control system 15 are relaxed, which makes it possible to reduce the construction costs of the wind turbine rotor 5

On the other hand, as shown in FIG. 7, the cylinder support portion 27 forms a substantially inverted V-shape that stands upright from the front end face 22 of the rotor hub 10, and the two legs 29 and 30 are angled to be substantially parallel to the axis at one rotation extremity α of the cylinder 35 and the axis at the other rotation extremity β of the cylinder 35; therefore, regardless of the rotation angle of the cylinder 35, the reaction force thereof can be efficiently borne at the two legs 29 and 30 of the cylinder support portion 27, and it is possible to achieve a reduction in weight of the pitch-control system 15 by virtue of the corresponding reduction in excess bulk of the cylinder support portion 27.

Furthermore, of the two leas 29 and 30 of the cylinder support portion 27, because the strength of the leg 29 to which a larger reaction force is applied from the cylinder 35 is made higher than the strength of the other leg 30, it is possible to increase the durability of the pitch-control system 15 by ensuring sufficient strength of the cylinder support portion 27, and at the same time, it is possible to achieve reductions in weight of the pitch-control system 15 and the wind turbine rotor 5 by virtue of the reduction in unnecessary thickness of the cylinder support portion 27.

Also, because the hydraulic oil tube 46 connected to the cylinder 35 is disposed so as to pass through the front end face 22 of the rotor hub 10 via the cylinder through-hole 26, together with the cylinder 35, installation of the hydraulic oil tube 46 is simplified, a reduction in weight, improved maintainability, and improved ease-of-layout are expected due to the reduction in length of the hydraulic oil tube 46, and by a combination of these effects, a reduction in construction costs can be expected.

Second Embodiment

Figure 12:
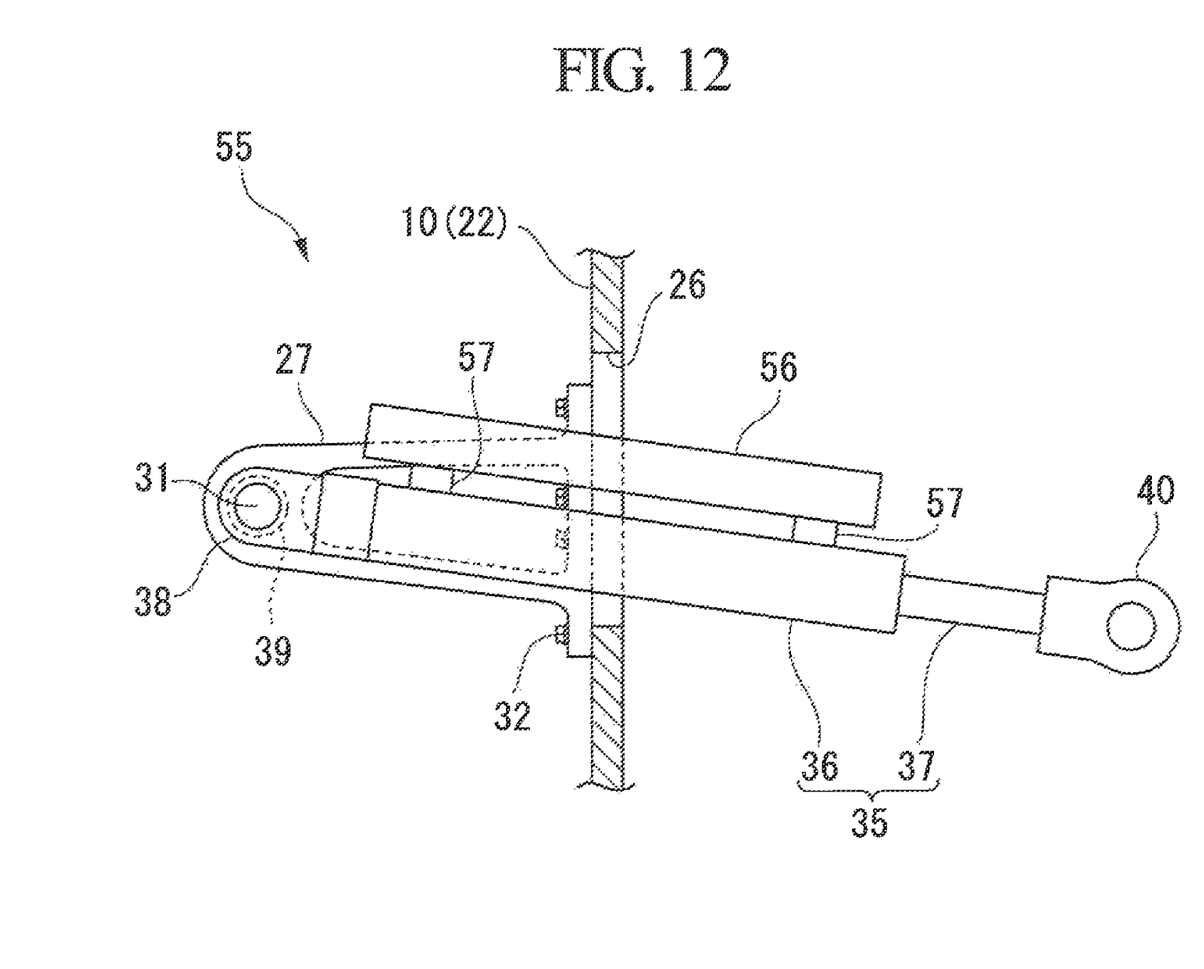
FIG. 12 is a plan view of a pitch-control system according to a second embodiment.

FIG. 12 is a plan view of the vicinity of the cylinder 35, showing a pitch-control system 55 according to a second embodiment of the present invention. Here, because elements other than an accumulator 56 and the position where it is disposed are the same as those in the first embodiment shown in FIG. 8, the individual parts are assigned the same reference numerals, and a description thereof is omitted.

The accumulator 56 is formed in the shape of a straight tube, similarly to the case of the accumulator 48 in the first embodiment, and this accumulator 56 is disposed in the vicinity of the cylinder 35 and parallel to the axis of the cylinder 35. The accumulator 56 and the cylinder 35 are coupled together by a pair of coupling portions 57 therebetween, forming a single integrated unit.

Then, the accumulator 56 is installed so as to pass through the front end face 22 of the rotor hub 10, via the cylinder through-hole 26, together with the cylinder 35. Therefore, the accumulator 56 rotates about the supporting shaft 31 together with the cylinder 35. Although the cylinder through-hole 26 is formed in the shape of an oval hole, similarly to the case in the first embodiment, the size in the long-axis direction thereof is widened by an amount corresponding to a width allowing the accumulator 56 to pass therethrough.

According the above-described embodiment, because the accumulator is installed in such a manner as to pass through the front end face 22 of the rotor hub 10 via the cylinder through-hole 26, together with the cylinder 35, the need to ensure a dedicated space for installing the accumulator 56 is almost entirely eliminated, which makes it possible to increase the space utilization efficiency inside or outside the rotor hub 10, to improve the ease of assembly and ease of maintenance around the pitch-control system 55, and to reduce construction, costs and running costs of the wind turbine generator 1 in which the wind turbine rotor 5 is used.

Third Embodiment

Figure 13:
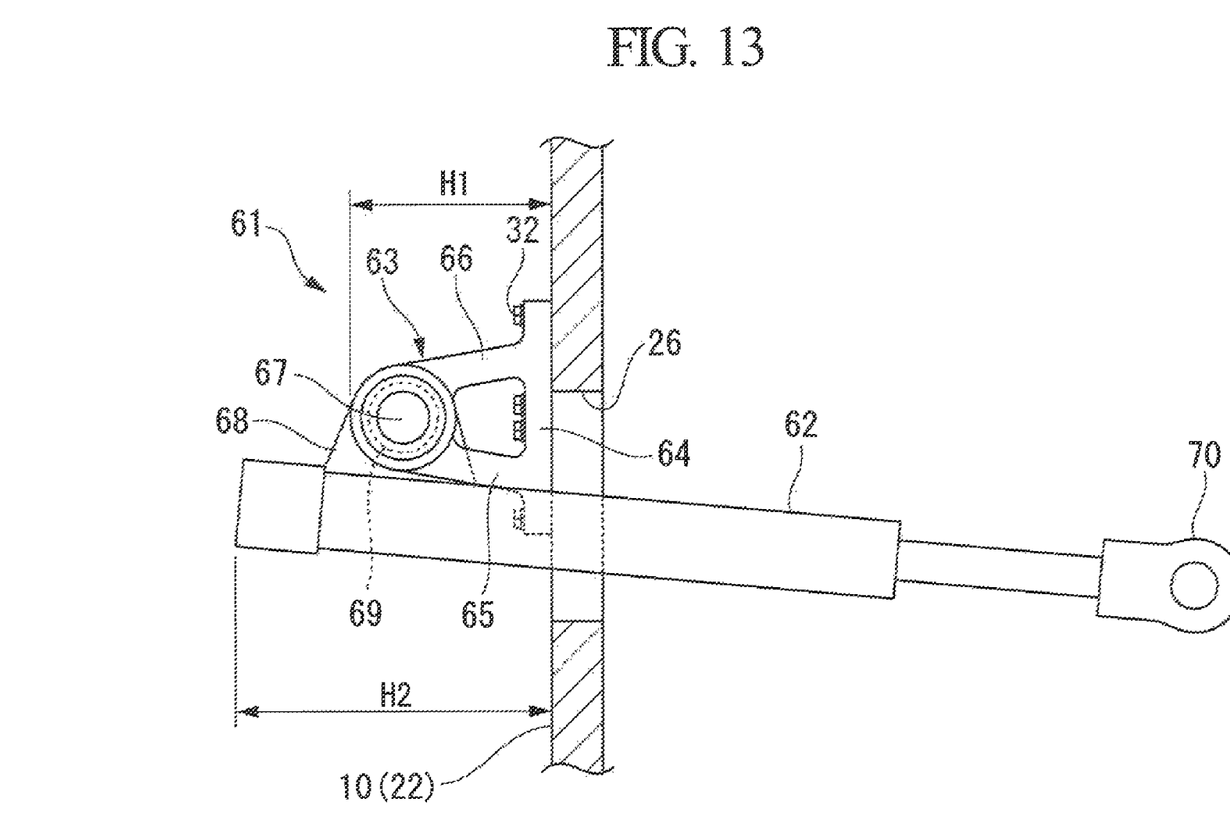
FIG. 13 is a plan view of a pitch-control system according to a third embodiment.

FIG. 13 is a plan view of the vicinity of a cylinder 62, showing a pitch-control system 61 according to a third embodiment. Here, because elements other than the shapes of the cylinder 62 and a cylinder support portion 63 are the same as those in the first embodiment shown in FIG. 8, the individual parts are assigned the same reference numerals, and a description thereof is omitted.

The structure of the cylinder support portion 63 is substantially the same as that of the cylinder support portion 27 in the first embodiment. That is to say, the cylinder support portion 63 includes a securing base 64 that is securely fixed to the front end face 22 of the rotor hub 10 by a plurality of fixing bolts 32, a pair of legs 65 and 66 that extend from this securing base 64, and a supporting shaft (support point) 67 provided at the tips of these legs 65 and 66 and between an opposing pair of the cylinder support portions 63, and forms substantially an inverted V-shape that stands upright from the front end face 22 of the rotor hub 10. However, the lengths of the legs 65 and 66 are smaller than those of the cylinder support portion 27 in the first embodiment, and a height H1 by which the cylinder support portion 63 protrudes from the front end face 22 is set to be smaller than or equal to a protrusion amount. H2 of the cylinder 62 from the front end face 22.

The cylinder 62 is the same as the cylinder 35 of the first embodiment in its basic structure; however, a coupling portion 68 of this cylinder 62, which is provided at a portion extending farther to the outer side of the cylinder through hole 26, is not at the tip of the cylinder 62, as it is in the first embodiment; rather, it is provided at an area, in the middle part of the cylinder 62, that projects from the front end face 22 of the rotor hub 10. Thus, this coupling portion 68 is coupled in a freely rotatable manner to the supporting shaft 67 of the cylinder support portion 63 via a spherical joint 69. The structure of a coupling portion 70 at the other end of the cylinder 62 and the structure coupling it to the wind turbine blade 11 are the same as in the first embodiment.

By setting the height H1 of the cylinder support portion 63 from the front end face 22 to be smaller than or equal to the amount of protrusion H2 of the cylinder 62 from the front end face 22 in this way, and by coupling the coupling portion 68, which is provided at the middle portion rather than at the tip of the cylinder 62, to the supporting shaft 67 of the cylinder support portion 63 in a freely rotatable manner via a spherical joint 69, the amount of protrusion H2 of the cylinder 62 from the front end face of the rotor hub 10 can be reduced by an amount corresponding to the space where the coupling portion 68 need not be provided at the tip of the cylinder 62. Therefore, the pitch-control system 61 can be made more compact. In addition, because the rotation center point (supporting shaft 67) of the cylinder 62 is closer to the cylinder through-hole 26, the size of the cylinder through-hole 26 (the dimension in the long-axis direction) can be reduced, which makes it possible to further decrease the strength reduction of the rotor hub 10 associated with formation of the cylinder through-hole 26.

As described above, with the pitch-control systems 15, 55, and 61 according to these embodiments, as well as the wind turbine rotor 5 and wind turbine generator 1 provided with these pitch-control systems 15, 55, and 61, it is possible to change the pitch angles of the wind turbine blades with a simple, lightweight, low-cost, and highly durable structure, without ruining the strength of the individual parts, including the rotor hub 10.

The present invention is not limited to the structures of the above-described embodiments, and various modifications that do not depart from the spirit of the invention are possible. For example, the shapes of the cylinder support portions 27 and 63 are not restricted to the shapes in the respective embodiments described above, and other shapes are possible. In addition, in the above-described embodiments, a description has been given of an example in which the present invention is applied to an upwind-type wind turbine generator 1 in which the wind turbine rotor 5 is provided at the front face of the nacelle 4; however, it may also be applied to a downwind-type wind turbine generator in which the wind turbine rotor is provided at the rear face of the nacelle. Naturally, the wind turbine rotor according to the present invention may also be applied to wind turbine apparatuses other than wind turbine generators.

What is claimed is:

1. A wind turbine blade pitch-control system for rotationally driving a wind turbine blade about an axis thereof relative to a rotor hub rotatably supported on a nacelle, the wind turbine blade pitch-control system comprising:
    a cylinder that is installed so as to pass through a through hole provided on an outer shell of an unsupported end of the rotor hub;
    a cylinder support portion attached to the outer shell of the rotor hub at a periphery of the through hole and provided with a support point that rotatably supports one end of the cylinder which is disposed outside the rotor hub; and
    a decentered coupling point provided at a decentered location on a root-side end face of the wind turbine blade and rotatably coupled to the other end of the cylinder which is disposed inside the rotor hub,
    wherein the cylinder support portion forms a substantially inverted V-shape that stands upright from the unsupported end of the rotor hub, as viewed from an axial direction passing through the support point, and two legs thereof are angled substantially parallel to an axis at one rotation extremity and an axis at another rotation extremity of the cylinder, respectively.

2. The wind turbine blade pitch-control system according to claim 1, wherein a cylinder coupling portion coupling with the support point and another cylinder coupling portion coupling with the decentered coupling point are coupled via spherical joints.

3. The wind turbine pitch-control system according to claim 1, wherein a strength of one of the two legs where a larger reaction force is applied from the cylinder is made higher than a strength of another leg of the two legs.

4. The wind turbine blade pitch-control system according to claim 1, wherein a hydraulic liquid tube connected to the cylinder is installed so as to pass through the unsupported end of the rotor hub together with the cylinder.

5. The wind turbine blade pitch-control system according to claim 1, wherein
    an accumulator that accumulates hydraulic pressure for the cylinder is formed in a straight tube shape, and
    the accumulator is disposed in a vicinity of the cylinder and parallel to an axis of the cylinder and is installed so as to pass through the unsupported end of the rotor hub together with the cylinder.

6. The wind turbine blade pitch-control system according to claim 1, wherein
    the cylinder has a cylinder body and a cylinder rod telescopically expanding from and retracting into the cylinder body, and
    a pitch angle of the wind turbine blade is controlled by expanding and retracting of the cylinder rod.

7. The wind turbine blade pitch-control system according to claim 6, wherein the cylinder is arranged substantially parallel to a rotation axis of the rotor hub and moves substantially horizontally.

8. The wind turbine blade pitch-control system according to claim 7, further comprising a coupling portion coupling the cylinder and the support point.

9. The wind turbine blade pitch-control system according to claim 8, wherein a height by which the cylinder support portion protrudes from a front end face of the rotor hub is smaller than or equal to a protrusion amount of the cylinder from the front end face of the rotor hub.

10. The wind turbine blade pitch-control system according to claim 1, wherein
    the two legs forms an opening on the cylinder support portion, and
    the cylinder support portion is attached to the outer shell of the rotor hub with connecting parts installed in the opening and two sides formed outside the two legs.

11. The wind turbine blade pitch-control system according to claim 1, wherein
    a plurality of said cylinder support portions is attached to the outer shell of the rotor hub symmetrically with respect to the through hole, one cylinder being attached to each of the cylinder support portion.

* * * * *